Feb. 14, 1961 H. SHAMES ET AL 2,971,701
UNIVERSAL BALL-JOINT CONNECTOR
Filed March 9, 1959 2 Sheets-Sheet 1
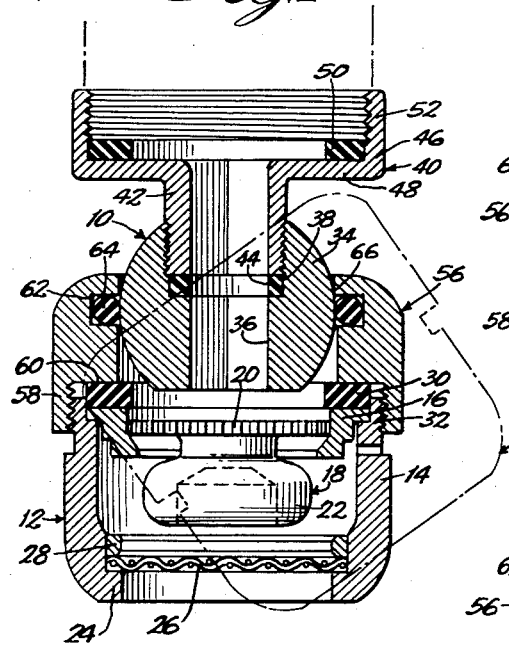
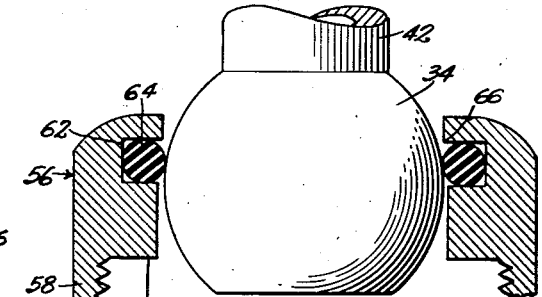
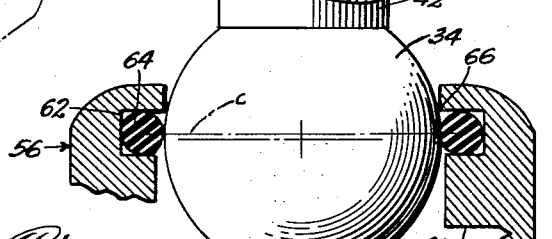
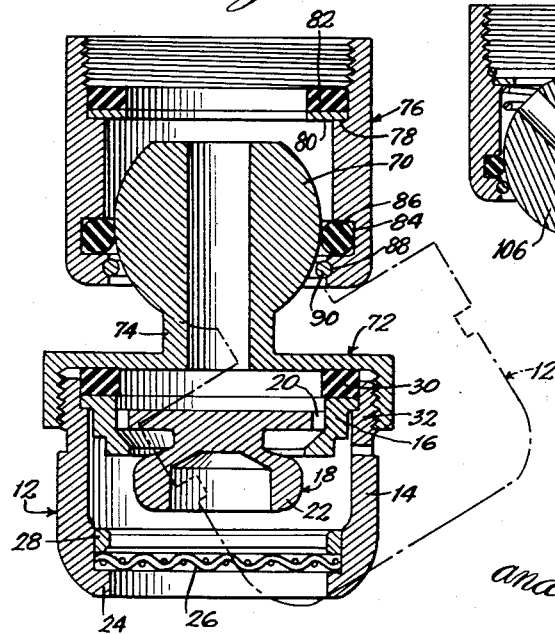
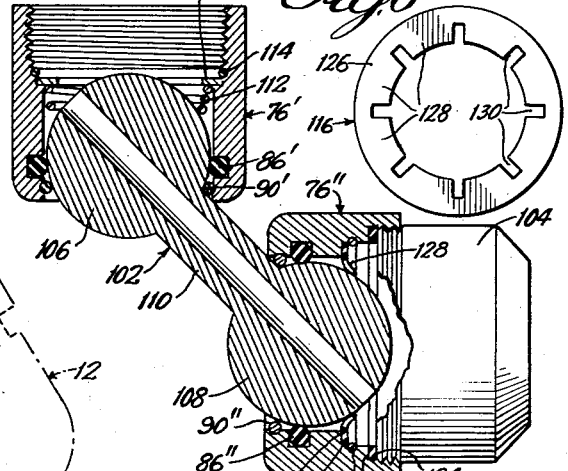
INVENTORS:
Harold Shames
and Sidney J. Shames,
BY Bair, Freeman & Molinare
ATTORNEYS.

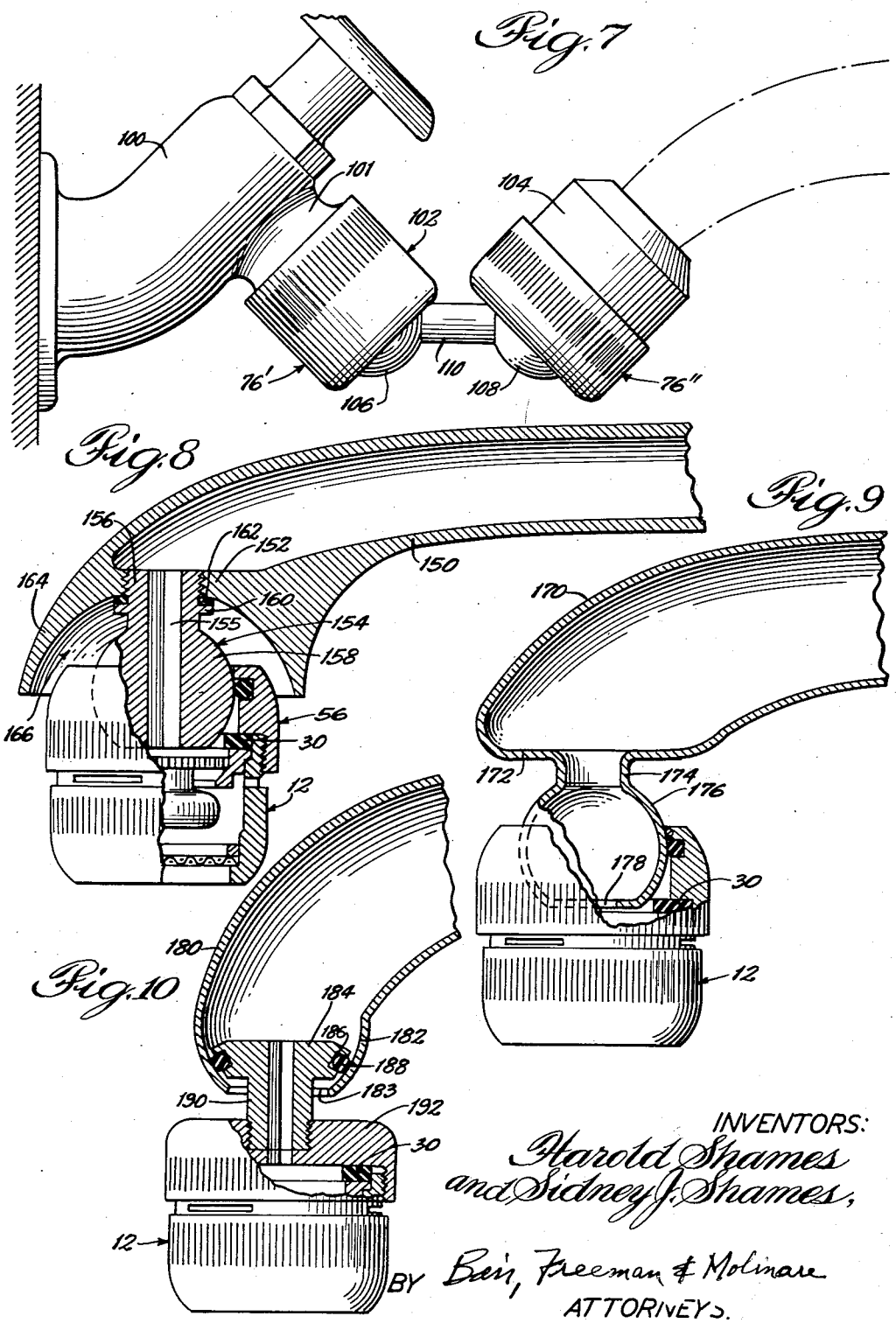

United States Patent Office 2,971,701
Patented Feb. 14, 1961

2,971,701
UNIVERSAL BALL-JOINT CONNECTOR

Harold Shames, 5 Agnes Circle, and Sidney J. Shames, 19 Agnes Circle, both of Ardsley, N.Y.

Filed Mar. 9, 1959, Ser. No. 797,938
6 Claims. (Cl. 239—587)

This invention relates to an improvement in ball-joint connectors and more particularly relates to a ball-joint connector to which may be connected liquid discharge devices, such as faucet aerators.

It has heretofore been well known to connect liquid discharge devices such as sprays, shower heads and aerating devices to ball-joint mountings therefor to provide a range of pivoting for the liquid discharge device relative to its mounting.

This invention is directed to an improvement in ball-joint connectors of the type to which may be connected a liquid discharge device. Others have heretofore attempted to provide a ball-joint connector wherein a ball is located in a coupling nut and cylindrical seal means are provided between the coupling nut and the ball, and pressure means are provided for pressing the seal means against the ball with increased force as better sealing is desired. Such prior constructions have the deficiency that with increased pressure between the cylindrical seal means and the ball, greater friction is generated which opposes and restrains free pivoting of the ball relative to the coupling nut.

Another deficiency in such previous constructions lay in the fact that sealing of the ball is intended to be effected eithere along an equatorial circle of the ball or downstream thereof. In such a construction it is inherent that better sealing may be effected only with undesirable increasing seal pressure, and further if there is the slightest movement or misalignment between the sealing surface of the ball and the surrounding seal means, there will probably be undesirable leakage through the ball coupling.

One object of this invention is to provide a ball-joint connector having means therein for providing a predetermined maximum sealing pressure which may be developed between the ball and the seal means, thereby preventing the generation of excess seal-gripping friction which restrains pivoting of the ball.

Another object of this invention is to provide a ball-joint connector with a coupling nut and which provides a seal for the ball-joint in the coupling nut along a circle spaced upstream from an equatorial plane of the ball.

A further object of this invention is to provide certain novel ball-joint type connectors particularly for use with aerating devices, which connectors provide for great freedom of movement of the aerating device.

Still another object of this invention is to provide certain novel combinations of faucets and faucet aerators.

Still a further object of this invention is to provide ball-joint connetcors which are characterized by their simplicity and efficiency of construction and operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a vertical cross-section view of a ball-joint connector with faucet aerator connected thereto, and illustrating the novel features of our ball-joint connector, and showing in dot-and-dash lines the range of pivoting of the aerator relative to the ball.

Figure 2 is an enlarged fragmentary view of the connection between the coupling nut and ball of the connector of Figure 1, and shows the parts before the seal means are compressed in sealing relationship.

Figure 3 is similar to Figure 2 but shows the parts with the seal means compressed to effect a seal.

Figure 4 is a view similar to Figure 1 but showing a modified form of construction and use of a ball-joint connector.

Figure 5 shows still another modification wherein there is provided a double ball-joint connector which permits of pivoting of an aerator over such a range as to dispose the outlet end of the aerator 90 degrees away from the outlet end of the faucet to which the connector is attached.

Figure 6 is a plan view showing details of a washer illustrtated in Figure 5.

Figure 7 illustrates use of the connector of Figure 5 with an inclined faucet to provide a fountain type attachment.

Figure 8 illustrates a new construction of faucet particularly for use with a pivotab'e foucet aerator.

Figure 9 illustrates still another type of faucet construction particularly for use with a pivotable foucet aerator.

Figure 10 illustrtates still a further type of faucet construction particularly for use with a pivotable faucet aerator.

Referring now to the drawings, there is shown in Figure 1 a ball-type connector, generally indicated at 10, to which is connected a liquid-flow-restricting discharge device such as an aerator 12, of the type which is generally shown and described in our Patent 2,707,624.

The aerator 12 includes a generally cylindrical casing 14 having positioned therein a combination guide and support ring 16, and upon which ring is supported a plug member 18 which includes a disc portion 20 with a grooved periphery, and a ball member 22 against which jets of water are directed to effect break-up and mixing of the water with air aspirated into the casing. The casing 14 has an inturned flange 24 formed at the discharge end of the casing, and a screen 26 mounted on flange 24 and being retained in position by means of a press-fit retaining ring 28. A sealing gasket 30 is supported on the upper, outwardly extending flange of guide ring 16, and the upper end of casing 24 is threaded at 32 for connection to a threaded coupling member. The aerator itself forms no part of this invention, but is described in the foregoing detail to complete the description of Figure 1.

The invention herein is directed to the ball-type connector 10, and said ball-type connector 10 includes a bored, liquid-conveying, ball means including ball member 34 which constitutes the greater portion of a sphere. The ball member 34 has a central, longitudinal, non-circular, preferably hexagonal, bore 36, and a circular counter-bore 38. An annular connector element 40 is provided having a neck 42 threaded at its extended end for threaded connection in circular counter-bore 38 to the ball member 34. A gasket 44 provides for sealing between connector 40 and ball 34. The inner dimension of gasket 44 and of neck 40 is of substantially the same dimension as the minimum dimension of non-circular bore 36 in ball member 34.

The connector element 40 includes a coupling portion 46 of enlarged dimension relative to neck 42, which coupling portion 46 provides a shoulder 48 for receiving an annular sealing gasket 50, and also includes an annular threaded flange 52 which provides for attachment of the connector 10 to the threaded outlet end of a faucet or the like which is delivering liquid under pressure. The exterior of flange 52 may be knurled or grooved to provide ease for gripping.

The connector 10 also includes an annular, elongated, coupling nut 56, the outer periphery of which is knurled or grooved for ease in gripping, and which has a threaded annular flange 58 at one end thereof and which is adapted for connection to the threaded casing of the aerator 12. The coupling nut 56 is shaped to define a gasket-engaging shoulder 60 adjacent flange 58, which shoulder engages gasket 30 to effect a seal between coupling nut 56 and the aerator 12. The coupling nut 56 is provided adjacent its other end with an internal circumferential groove 62 in which a seal means 64, in the form of an O-ring, is positioned and retained. The characteristics of O-rings are well known and, for example, are described in U.S. Patent 2,180,795. While the cross-section of the specific O-ring is here shown to be circular, it will be understood that O-rings of different cross-section are well known and may be used, the requirement being that the seal means 64 be a pre-formed, elastic and compressible seal, as best typified by an O-ring. The coupling nut 56 also defines a rigid, circular, ball-engaging portion 66 which in part bounds groove 62 and which is of smaller internal dimension than any other portion of the coupling nut 56, and said ball-engaging portion 66 is adapted to engage the periphery of the ball member 34 to provide a firm abutment therebetween which permits of universal relative pivoting movement of the coupling nut 56 relative to the ball member 34. The ball member 34 which is received within nut 56 is of no greater dimension than all other internal dimensions of the annular coupling nut 56 except for said ball-engaging portion 66, thereby providing that any engagement between coupling nut 56 and ball member 34 will be effected by ball-engaging portion 66.

The O-ring type seal means 64 is an elastic circular ring which serves as the seal means between ball 34 and coupling nut 56 and is of such dimension that its internal dimension is less than the maximum dimension of the adjacent portions of ball member 34, and therefore the O-ring 62 extends radially inwardly of the nut 56 to engage the surface of ball member 34 along a peripheral circle. Figure 2 illustrates the relationship of the parts at the point where seal means 64 first engages the ball member 34. In Figure 2 the ball-engaging portion 66 of the coupling nut 56 is spaced from the periphery of the ball member 34. When water is flowing through the ball member, and builds up pressure within the aerator 12, the tendency of the pressure is to move the aerator 12, and the coupling nut 56 attached thereto, downstream relative to the ball 34, or toward the position shown in Figure 3.

In Figure 3, the parts are shown with the ball-engaging portion 66 of coupling nut 56 engaging the periphery of ball member 34 and, at this point, the elastic circular seal means 64 have been compressed against its inherent elasticity to their full-sealing condition. Since the coupling member 56 in Figure 3 is seated firmly against ball member 34, there is only a pre-determined maximum amount of liquid-tight sealing compression of the seal means 64, and hence there is no increase in friction over and above that attained by the parts when in the position of Figure 3. The type of sealing that is herein disclosed is known as sealing "with the pressure" of the liquid that is flowing through the device. That is, if for some reason the seal is not fully seated, then, upon the application of pressure from the liquid passing through the coupling, the pressure of the liquid itself forces the parts into a sealing condition and assists in effecting a better seal between the parts and thereby prevents leakage of liquid through the joint.

In order to obtain a tight and efficient seal, the parts are arranged so that the ball-engaging portion 66 engages the ball member 34 on a peripheral circle above the maximum diameter, or equator, of the ball member 34, and this relationship positions an equatorial plane of the ball member 34, the one perpendicular to the axis of nut 56, between the ends of the coupling nut 56. The device is also designed so that the compressed portion of the seal means 64 is located either at the equator of the ball member 34 or, preferably, slightly upstream thereof, but in no event below the equator of the ball member 34, so that the seal means 64 engages ball 34 between said equatorial plane of ball 34 and said ball-engaging means 66.

In the assembly of the device, because of the fact that the ball member 34 is of greater dimension than the ball-engaging portion 66 of the coupling nut 56, the ball member is fitted through the downstream end of the coupling nut 56 with its threaded counter-bore 38 exposed and then the connector element 40 is threaded to the ball 34, to produce the assembly shown in Figure 1. Where the connector element 40 and the ball member 34 are of unitary construction, then the coupling nut 56 has to be made in two parts to provide a separable ball-engaging portion which extends inwardly of the innermost dimension of the coupling nut.

The latter constructional feature is illustrated in the modified form shown in Figure 4. In Figure 4, the ball member 70 is formed integrally with the connector portion 72, which is spaced from the ball member 70 by a reduced neck 74. The connector portion 72 has an aerator 12 connected thereto. In Figure 4, the connector portion 72 is positioned downstream or below ball 70, while in Figure 1 the connector 46 is positioned above ball 34. It will be understood that the connector of both Figures 1 and 4 may be inverted. In Figure 4, the coupling nut is shown at 76 and is of generally annular construction, with no part of said coupling nut of smaller dimension than the maximum dimension of the ball 70.

The coupling nut 76 is provided with a shoulder 78 which supports a rigid metal washer 80 upon which is positioned a sealing gasket 82. The coupling nut 76 is provided with a circumferential groove 84 in which is positioned an O-ring-type sealing means 86. In order to provide means for engaging the ball member 70 to permit of universal pivoting between ball member 70 and coupling nut 76, a portion of coupling nut 76, adjacent groove 84 and located axially outwardly relatively thereto, is circumferentially grooved, or recessed, at 88 to receive a split ring 90 therein, which ring 90 is adapted to engage the periphery of ball 70 to provide for universal pivoting at such firm abutment between the ball 70 and coupling nut 76. It is, of course, understood that the engagement and compression of seal means 86 in Figure 4 is in accordance with the same principles as spelled out hereinabove in the description of Figures 1–3.

Figures 5 and 7 show a double-ball-type connector. Figure 7 shows a typical use of such a device, wherein there is provided a wall-type faucet 100 with an inclined discharge spout 101. The double-ball-joint connector 102, when connected to the inclined spout 101, provides that an aerator 104, connected to the extended end of connector 102, will discharge a stream in a direction as much as 90 degrees from the direction in which the stream would normally be discharged from spout 101. The double ball-joint connector 102 affords universal relative movement between the connector 102 and faucet 100 independently of the universal relative movement between connector 102 and aerator 104. This affords means for directing the flow of aerated water over a continuous range of directions including directions in a plane perpendicular to the normal direction of discharge from faucet 100. Figure 7 shows the use of such a device as a drinking spout, or bubbler.

Figure 5 shows certain details of the construction of connector 102. In Figure 5, the double ball-joint connector 102 includes a pair of spaced ball members 106 and 108 interconnected by a reduced neck 110, the length of which permits of the maximum range of pivoting shown in Figure 5, between the coupling members connected to the balls. A first coupling nut 76', of similar construction to that shown in Figure 4, is provided, and further includes an annular resilient means in the form of conical coil spring 112, the large end of which abuts the underside of a washer 80', which is securely held in position by means of a split snap ring 114. The other end of the spring 112 engages the ball 106 on the side of the equatorial plane of ball 106 opposite to seal 86' and normally forces ball 106 against a split ring 90' carried by nut 76', and thereby normally pressing the ball 106 in sealing relation against the O-ring 86'.

The other coupling nut shown in Figure 5 is identified as 76" and it, too, is of similar construction to coupling nut 76 shown in Figure 4, except that the annular resilient means is in the form of a washer-type spring biasing member 116 mounted on a shoulder 118, and clamped thereagainst by a split ring 120, while coupling nut 76" provides a second shoulder 122 against which is positioned a sealing gasket 124 for sealing against an aerator 104. The spring washer 116 is best seen in Figure 6 and includes an annular continuous portion 126 having a plurality of resilient fingers 128 extending inwardly therefrom and spaced from each other by notches 130. The engagement of the fingers 128 with ball 108 operates substantially in the same manner as spring 112 to normally bias ball 108 toward split ring 90" and into sealing engagement with O-ring 86".

In the device shown in Figure 8, there is provided a hollow spout member 150 as part of a faucet, which spout is provided with a wall 152 positioned across the normal discharge end of the spout 150. The discharge wall 152 is bored and tapped and receives therein the threaded tubular stem 154 of a ball connector 156. An outwardly extending flange 160 is provided on stem 156, and sealing gasket 162 is provided between flange 160 and wall 152. The ball portion 158 of ball connector 154 provides means for connection thereto of a coupling nut 56 and aerator 12, similar to that shown in Figure 1. The bore 155 through stem 154 and ball 156 is preferably hexagonal to provide means for manipulating the ball 156 in assembly to and disassembly from spout 160.

The spout 150 is also shaped to define a dependent skirt 164 which extends below the discharge wall 152 and serves as an extension of the normal outer peripheral shape of the spout 160. The skirt 164 bounds a generally spherical recess 166 downstream and outwardly of wall 152, and the upper portion of coupling nut 56 is positioned within recess 166 so that the skirt 164 operates in part to conceal ball 158 and to make the aerator 12 appear to be an integral part of the faucet spout 150, while permitting relative movement of the aerator relative to spout 150 for discharging the aerated stream at selected angles relative to the wall 152. The concealed type of mounting may be preferred for aesthetic reasons.

In Figure 9, there is shown a spout 170 formed of sheet metal, or the like, which is shaped and formed to define an annular transverse discharge wall 172 which merges with a reduced neck 174, and with a spherically shaped ball member 176 having a discharge aperture 178 formed therein. Again, a coupling nut, similar to that disclosed in Figures 4 and 5 and aerator are provided, universally mounted on ball member 176. The coupling member is formed with a split ring thereon to permit of assembly of the coupling nut on the ball member 176.

In Figure 10, there is again shown a wrought metal tubular spout 180 which is shaped and formed, adjacent its outlet end, to define a portion 182, having a spherical interior and also defining a discharge opening 183. Positioned within the spherical portion 182, and of greater dimension than the discharge opening 183, is a spherical, annular, connector segment, which segment is defined by a pair of parallel planes which intercept a ball-type member. The spherical segment 184 is provided with a peripheral groove 186 and carries therein an O-ring-type sealing means 188 for sealing engagement with the inner wall of spherical portion 182 of the spout. A tubular stem 190 extends downstream from connector 184 through the spout opening 183 and has threaded thereto a coupling nut member 192 to which an aerator 12 may be connected. The stem 190 together with segment 184 defines a flow transmitting ferrule pivotable in said discharge opening 183 with a head on said ferrule pivotably engaging the inner wall of spherical portion 182. It will be seen that the pressure of the water passing through spout 180 forces the parts into sealing relationship but, nevertheless, permits of universal movement for providing means for directing the angle of discharge of a stream that issues from aerator 12. The ferrule may be assembled in spout 180 by being introduced through the large open end of spout 180, the end which is not shown.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States is:

1. In a ball type connector to which a liquid flow-restricting discharge device is to be connected; the improvement comprising, in combination: bored ball means having a spherical external surface and through which liquid under pressure is conveyed; an annular, elongated coupling nut receiving therein the ball means to permit relative pivoting movement between the ball means and coupling nut, said coupling nut having connector means at one end thereof, rigid, circular ball engaging means at the other end of said coupling nut normally in contact with said ball means and rigidly and slidably engaging the external spherical surface of said ball means, so that the portion of said ball means of greatest dimension is disposed between the ends of said coupling nut, there being an equatorial plane of said ball means which is perpendicular to the axis of said coupling nut, said coupling nut having an internal circumferential groove therein, an elastic O-ring type seal retained in said circumferential groove and extending radially inwardly of the coupling nut and engaging the external spherical surface of the ball means on a peripheral circle located closely adjacent to said equatorial plane and between said equatorial plane and the circle against which said ball engaging means abuts, said O-ring type seal being stressed against its inherent elasticity a predetermined amount to effect a predetermined maximum liquid-tight sealing pressure when said ball engaging means on said coupling nut normally engages said ball means, and a flow-restricting liquid discharge device connected to one of said pair of members consisting of said ball means and coupling nut for effecting firm, but readily pivotable, engagement between said ball means and ball engaging means of said coupling nut and to effect liquid-tight engagement with said seal means.

2. A device as set forth in claim 1 wherein said ball engaging means is an inwardly extending flange integral with said coupling nut which in part bounds said circumferential groove.

3. A device as set forth in claim 1 wherein said ball engaging means is a split ring removably carried on said coupling nut, and said split ring extending radially inwardly of the smallest inner dimension of said coupling nut.

4. In a ball type connector to which a liquid flow-restricting discharge device is to be connected; the improvement comprising, in combination: bored ball means having a spherical external surface and through which liquid under pressure is conveyed; an annular, elongated coupling nut receiving therein the ball means to permit relative pivoting movement between the ball means and coupling nut, said coupling nut having connector means at one end thereof, rigid, circular ball engaging means at the other end of said coupling nut normally in contact with said ball means and rigidly and slidably engaging the external spherical surface of said ball means, so that the portion of said ball means of greatest dimension is disposed between the ends of said coupling nut, there being an equatorial plane of said ball means which is perpendicular to the axis of said coupling nut, said coupling nut having an internal circumferential groove therein, an elastic O-ring type seal retained in said circumferential groove and extending radially inwardly of the coupling nut and engaging the external spherical surface of the ball means on a peripheral circle located closely adjacent to said equatorial plane and between said equatorial plane and the circle against which said ball engaging means abuts, said O-ring type seal being stressed against its inherent elasticity a predetermined amount to effect a predetermined maximum liquid-tight sealing pressure when said ball engaging means on said coupling nut normally engages said ball means, and a flow-restricting liquid discharge device connected to one of said pair of members consisting of said ball means and coupling nut for effecting firm, but readily pivotable, engagement between said ball means and ball engaging means of said coupling nut and to effect a liquid-tight engagement with said seal means, and annular resilient means carried by said coupling nut and engaging said ball means on the side of said equatorial plane opposite from said seal means, said resilient means biasing said ball means toward said seal means.

5. A device as set forth in claim 4 wherein said annular resilient means is a helical coil spring.

6. A device as set forth in claim 4 wherein said annular resilient means is an annular ring with inwardly extending resilient fingers.

References Cited in the file of this patent

UNITED STATES PATENTS

| | | |
|---|---|---|
| 2,197,667 | Shook | Apr. 16, 1940 |
| 2,316,135 | Turek et al. | Apr. 6, 1943 |
| 2,565,554 | Goodrie | Aug. 28, 1951 |
| 2,596,909 | Mufich et al. | May 13, 1952 |
| 2,707,624 | Shames et al. | May 31, 1955 |
| 2,761,662 | Goodrie | Sept. 4, 1956 |
| 2,765,197 | Chimbole | Oct. 2, 1956 |